United States Patent
Schiele et al.

(10) Patent No.: US 9,744,863 B2
(45) Date of Patent: Aug. 29, 2017

(54) METHOD FOR OPERATING A MOTOR VEHICLE AND CORRESPONDING MOTOR VEHICLE

(71) Applicant: AUDI AG, Ingolstadt (DE)

(72) Inventors: Günter Schiele, Egweil (DE); Boris Blasinski, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/286,633

(22) Filed: Oct. 6, 2016

(65) Prior Publication Data

US 2017/0096071 A1 Apr. 6, 2017

(30) Foreign Application Priority Data

Oct. 6, 2015 (DE) .......................... 10 2015 012 900

(51) Int. Cl.
*B60L 11/02* (2006.01)
*B60L 11/18* (2006.01)

(52) U.S. Cl.
CPC ........... *B60L 11/02* (2013.01); *B60L 11/1809* (2013.01); *B60L 11/1861* (2013.01); *B60L 2240/54* (2013.01); *B60L 2240/60* (2013.01); *B60Y 2300/91* (2013.01)

(58) Field of Classification Search
CPC .............. B60L 11/1809; B60L 11/1824; B60L 11/1838; B60L 11/1822; B60L 7/20
See application file for complete search history.

(56) References Cited

U.S. PATENT DOCUMENTS

| 8,676,423 | B2 | 3/2014 | Blasinski et al. | |
| 2004/0030471 | A1* | 2/2004 | Faye | B60K 6/48 |
| | | | | 701/22 |
| 2013/0211642 | A1 | 8/2013 | Blasinski et al. | |
| 2015/0032317 | A1 | 1/2015 | Kato | |

(Continued)

FOREIGN PATENT DOCUMENTS

| DE | 101 28 758 A1 | 12/2002 |
| DE | 10 2006 062 584 A1 | 7/2008 |
| DE | 10 208 015 046 A1 | 9/2008 |

(Continued)

*Primary Examiner* — John Walters
*Assistant Examiner* — James Triggs
(74) *Attorney, Agent, or Firm* — Henry M. Feiereisen LLC

(57) ABSTRACT

A method for operating a motor vehicle includes operating the motor vehicle in a drive mode, a recuperation mode or a charging mode, wherein when operating the motor vehicle in the recuperation mode, a recuperation driving route driven during the recuperation mode and an associated recuperation energy amount are determined and are stored as driving route data in a driving route memory and/or are transmitted to an external data storage device; wherein when switching into the charging mode or when operating the motor vehicle in the charging mode an expected driving route of the motor vehicle is predictively determined and for the expected driving route the driving route data are read out from the driving route memory and/or are requested from external data storage device; wherein the target state of charge is set to a value which is determined from a maximal state of charge of the energy storage and the recuperation energy amount stored in the driving route data.

10 Claims, 1 Drawing Sheet

(56) References Cited

U.S. PATENT DOCUMENTS

2015/0061550 A1 3/2015 Schulz et al.
2015/0097512 A1 4/2015 Li et al.

FOREIGN PATENT DOCUMENTS

| DE | 10 2008 027 212 A1 | 12/2009 |
| --- | --- | --- |
| DE | 10 2009 028 751 A1 | 2/2011 |
| DE | 10 2011 082 336 A1 | 3/2013 |
| DE | 10 2012 209 645 A1 | 12/2013 |
| DE | 10 2012 015 949 A1 | 3/2014 |
| DE | 10 2013 217 897 A1 | 3/2015 |
| DE | 10 2014 219 658 A1 | 4/2015 |

\* cited by examiner

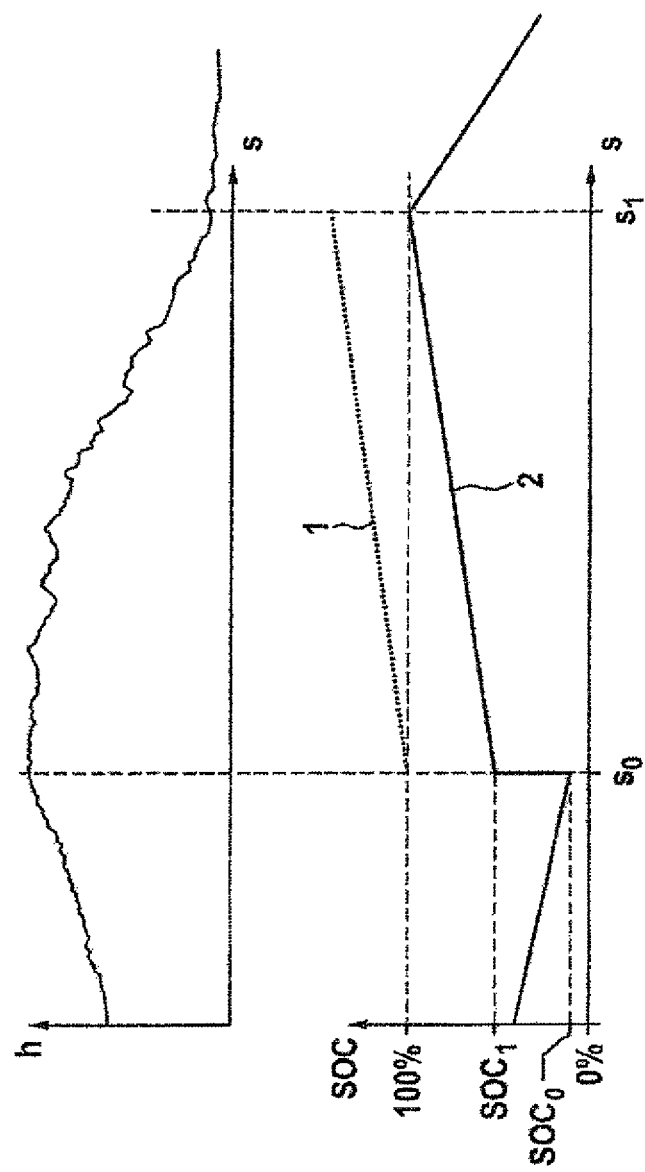

METHOD FOR OPERATING A MOTOR VEHICLE AND CORRESPONDING MOTOR VEHICLE

CROSS-REFERENCES TO RELATED APPLICATIONS

This application claims the priority of German Patent Application, Serial No. 10 2015 012 900.7, filed Oct. 6, 2015, pursuant to 35 U.S.C. 119(a)-(d), the content of which is incorporated herein by reference in its entirety as if fully set forth herein.

BACKGROUND OF THE INVENTION

The invention relates to a method for operating a motor vehicle.

The following discussion of related art is provided to assist the reader in understanding the advantages of the invention, and is not to be construed as an admission that this related art is prior art to this invention.

The drive device serves for driving the motor vehicle, i.e., for providing a torque that is directed towards driving the motor vehicle. The torque can hereby be either directed towards acceleration or towards deceleration of the motor vehicle, wherein the former results in a positive longitudinal acceleration of the motor vehicle in a forward driving direction of the vehicle, and the latter results in a negative longitudinal acceleration of the motor vehicle in the forward driving direction. The electric drive device can provide the torque for example purely electrically, i.e., solely by means of an electric machine or an electric motor. In this case the motor vehicle can be configured as an electric vehicle.

Beside the electric machine the drive device can of course also have a further drive aggregate, which is preferably of a different type than the electric machine. The further drive aggregate is for example constructed as an internal combustion engine. Correspondingly the drive device is configured as a hybrid drive device, in particular as plug-in hybrid drive device.

The drive device or the motor vehicle can be operated in different operating modes, for example the drive mode, the recuperation mode and the charging mode. In the drive mode electric the electric machine is operated as a motor and the torque that is directed towards acceleration of the motor vehicle is provided or generated by the electric machine. This is accomplished by means of energy withdrawn from the energy storage, in particular exclusively by means of energy withdrawn from the energy storage. As an alternative it is also possible to provide or generate electrical energy for operating the electric machine in a different manner, for example by means of the further drive aggregate, i.e., preferably the internal combustion engine.

In the recuperation mode on the other hand the electric machine is used to charge the energy storage. For this purpose the electric machine is operated as a generator and the torque that is directed toward the deceleration of motor vehicle is provided or produced. In the recuperation mode kinetic energy of the motor vehicle is thus converted into electrical energy and the energy storage is charged with this electrical energy.

From time to time it may be required to charge the energy storage with externally provided electrical energy. This is provided in the charging mode. The charging mode is for example performed during a standstill of the motor vehicle, for example at a stationary charging device. The energy storage is charged until the predetermined target state of charge is reached. Correspondingly the charging mode is performed until this condition is satisfied. The target state of charge can for example be a maximal state of charge of the energy storage, at which the energy storage is maximally charged. The maximal state of charge is for example determined by a manufacturer of the energy storage or the motor vehicle. In the maximal state of charge for example the age of the energy storage can be taken into account, wherein the maximal state of charge for example decreases with increasing age of the energy storage.

It would be desirable and advantageous to provide a method for operating a motor vehicle, which has advantages compared to known methods and in particular enables an efficient use of the electric machine and the electrical energy temporarily stored in the energy storage.

SUMMARY OF THE INVENTION

According to one aspect of the present invention a method for operating a motor vehicle which has an electrical drive device, said method includes operating the motor vehicle in one of three modes, a driving mode in which an electric machine of the drive device is operated as motor, wherein by means of electrical energy withdrawn from an energy storage a torque that is directed toward an acceleration of the motor vehicle is provided, a recuperation mode in which the electric machine is operated as a generator, wherein a torque that is directed toward a deceleration of the motor vehicle is provided and electrical energy generated thereby is temporarily stored in the energy storage, and a charging mode in which the energy storage is charged with externally provided electrical energy until a predetermined target state of charge is achieved; when operating the motor vehicle in the recuperation mode, determining a recuperation driving route driven during the recuperation mode and an associated recuperation energy amount and storing the recuperation driving route and the recuperation energy amount as driving route data in a driving route memory and/or transmitting the driving route data to an external data storage device; when switching into the charging mode or when operating the motor vehicle in the charging mode predictively determining an expected driving route of the motor vehicle and for the expected driving route reading out the driving route data from the driving route memory and/or requesting the driving route data from the external data storage device; and setting the target state of charge to a value which is determined from a maximal state of charge of the energy storage and the recuperation energy amount stored in the driving route data.

Thus when performing the recuperation mode the recuperation driving route driven in the respective recuperation mode, preferably its starting point and end point, and the recuperation energy amount generated on the recuperation driving route are determined, and are stored in the form of driving route data. Preferably this approach is provided whenever performing the recuperation mode, i.e., at every instance of decelerating the motor vehicle by means of the electric machine that is operated as a generator. The term recuperation driving route preferably means the geographic route driven by the motor vehicle in the recuperation mode.

The recuperation driving route insofar contains geographic positional information, for example the geographic starting point and the geographic end point of the recuperation driving route. In addition further geographic intermediate points situated between the starting point and the end point can be recorded in order to record the course of the recuperation driving route with higher accuracy. The recuperation driving route can generally be determined in any desired manner. Particularly preferably positional data of a navigation device of the motor vehicle are used. For example the recuperation driving route is determined by means of a satellite supported position determination.

The term recuperation energy amount can be understood as the energy amount directly produced by means of the electric machine when operated as a generator. Preferably this term however describes the energy amount which is available after the temporary storage of the energy amount generated by the electric machine and which is later available for driving the electric machine as a motor for example in the driving mode. Correspondingly the recuperation energy amount can take the efficiency of the electric machine and/or the energy storage into account. When the efficiency of the electric machine is taken into account only the efficiency of the electric machine operated as generator, only the efficiency of the electric machine operated as a drive device or only the efficiency of the electric machine operated as generator and the efficiency of the electric machine operated as motor can be taken into account. Of course also an efficiency of the energy storage can be taken into account in addition or as an alternative.

The recuperation driving route driven in the recuperation mode and the associated recuperation energy amount are stored in the form of the driving route data in the driving route data memory and/or are transmitted to the external data storage device and stored there. The driving route memory is provided on board the motor vehicle, while the external data storage device is for example a stationary data storage device and/or a driving route memory of a further motor vehicle. While the driving route data are stored in the driving route memory usually via a cable based connection, the transmission of the driving route data to the external data storage device is preferably provided via a wireless connection, in particular a radio connection. For example a navigation device of the motor vehicle is used as driving route storage so that the driving route data are stored together with the navigation data or are embedded in the navigation data.

As explained above in the charging mode the energy storage is charged with externally provided electrical energy until the predetermined target state of charge is reached. In order to use the energy produced in the recuperation mode and the energy storage as efficiently as possible the expected driving route of the motor vehicle is to be predictively determined when switching into the charging mode or when driving in the charging mode. The expected driving route of the motor vehicle describes the driving route that the motor vehicle is expected to drive on during a driving operation that follows, in particular immediately, the charging mode. The expected driving route can generally be determined in any desired manner.

For the expected driving route driving route data are read out from the driving route memory and/or are requested from the external data storage device if available. Thus when driving route data are already available for the expected driving route or sections of the expected driving route, these data are read out or requested. The reading out or requesting of the driving route data can hereby be limited to those driving route data that relate to the recuperation driving route that will be encountered first on the expected driving route. In addition or as an alternative the driving route data can also be limited to those driving route data, which are situated on the expected driving route within a predetermined distance. However it can also be provided that the driving route data are read out or requested for all recuperation driving routes situated on the expected driving route.

The target state of charge is set to the value, which is determined from the maximal state of charge of the energy storage and the recuperation energy amount stored in the driving route data. For example the target state of charge corresponds to the maximal state of charge minus the stored recuperation energy amount. This ensures that the energy storage reaches the maximal state of charge during the recuperation mode or at least reaches the maximal state of charge only at the end of the recuperation mode. Correspondingly the entire energy amount generated during the recuperation mode can be temporarily stored in the energy storage.

On one hand this is useful regarding the energy efficiency of the drive device and thus the motor vehicle. On the other hand in a pure electric drive device the motor vehicle can no longer be decelerated only by means of the electric machine. Rather it is required to use an additional operating brake of the motor vehicle. In these cases the latter is subjected to excessive stress because no motor brake is available. In addition the driver of the motor vehicle usually has to actuate the brake pedal differently, in particular stronger, in order to achieve the same braking effect at fully filled energy storage compared to an only partially filled energy storage.

In a hybrid drive device the further drive aggregate, for example the internal combustion engine, has to be for example coupled at fully filled energy storage in order to continue to produce the torque directed toward deceleration of the motor vehicle. An operation of the further drive aggregate however is not plausible for the driver of the motor vehicle because he does usually not actuate a gas pedal during the recuperation mode but only the brake pedal. In any case the driver of the motor vehicle thus has to sacrifice comfort. This can be avoided with the described approach.

According to another advantageous feature of the invention, the predictive determination of the expected driving route involves generating a driving route profile of the motor vehicle and/or using calendar data of a driver of the motor vehicle. As explained above the predictive determination can be performed in any desired manner. In addition or as an alternative calendar data of the driver can be used which are for example stored in a mobile device of the driver, for example a mobile phone or the like.

According to another advantageous feature of the invention, the target state of charge is determined from a first prescribed state of charge and/or a second prescribed state of charge, wherein the target state of charge is set equal to the second prescribed state of charge, when the second prescribed state of charge is greater than the first prescribed state of charge, and wherein the target state of charge is set equal to the first prescribed state of charge when the second prescribed state of charge is smaller than the first prescribed state of charge. The first prescribed state of charge insofar represents a minimal state of charge for the energy storage to which the energy storage is at least charged during the charging mode. The second prescribed state of charge on the other hand limits the state of charge of the energy storage achieved during the charging operating mode upwards.

Hereby however the first prescribed state of charge has preference so that the target state of charge is set to the first prescribed state of charge when the second prescribed state of charge is smaller than the first prescribed state of charge. On the other hand when the second prescribed state of charge is greater than the first prescribed state of charge the target state of charge can be limited upwards and correspondingly the target state of charge can be set equal to the second prescribed state of charge.

According to another advantageous feature of the invention, the first prescribed state of charge corresponds to the amount of energy required for reaching the recuperation driving route that is stored in the driving route data. When for example the charging mode is spaced apart from the recuperation driving route that lies on the expected driving route of the motor vehicle it has to be ensured that the motor vehicle can reach the recuperation driving route during a driving operation that follows the charging mode. For this purpose the first prescribed state of charge is set correspondingly.

According to another advantageous feature of the invention, the second prescribed state of charge is set to the maximal state of charge minus the recuperation energy amount. The maximal state of charge or its determination was mentioned above. The second prescribed state of charge is to correspond to the maximal state of charge minus the recuperation energy amount so that it is ensured that the energy storage is completely charge only at the end of the recuperation driving route.

According to another advantageous feature of the invention, the energy amount required for reaching the recuperation driving route stored in the driving route data is added to the second prescribed state of charge. The approach mentioned above in which the second prescribed state of charge is set to the maximal state of charge minus the recuperation energy the energy amount is in particular advantageous when the charging mode is performed immediately prior to the beginning of the recuperation driving route or at the beginning of the recuperation driving route. However when during the performance of the charging mode the motor vehicle is located at a distance to the recuperation driving route it is advantageous to charge the energy storage to the degree so that it is only partially filled at the beginning of the recuperation driving route and is fully charged again at the end point of the recuperation driving route. For this purpose the energy amount required for reaching the recuperation driving route is taken into account. Of course it is also advantageous in this context when the first prescribed state of charge and/or the second prescribed state of charge are limited to the maximal state of charge.

According to another advantageous feature of the invention, when multiple recuperation driving routes are present on the expected driving route only a first one of the multiple recuperation driving routes or the recuperation driving route which is stored with the highest energy amount is taken into account. Thus when multiple recuperation driving routes are present on the expected diving route a rational selection is made among these. Of course as an alternative also all of the recuperation driving routes that are present on the expected driving route can be taken into account.

According to another advantageous feature of the invention, when multiple recuperation driving routes are present on the expected driving route the second prescribed state of charge is selected so that for the multiple recuperation driving routes the state of charge of the energy storage is sufficient after each of the recuperation driving routes. In particular this is provided for all of the recuperation driving routes that lie on the expected driving route. Hereby it has to be ensured however, that the second prescribed state of charge is preferably limited upwards to the maximal state of charge i.e., does not exceed the maximal state of charge.

According to another advantageous feature of the invention, the driving route data are provided by the external data storage device to at least one further motor vehicle. Insofar not only the motor vehicle itself but also the at least one further motor vehicle can use the driving route data stored in the external data storage device. As mentioned above the external data storage device can be a stationary data storage device or as an alternative the driving route memory of the at least one further motor vehicle.

According to another aspect of the invention, said motor vehicle being configured to be operated in three operating modes a driving mode in which an electric machine of the drive device is operated as motor, wherein by means of electrical energy withdrawn from an energy storage a torque that is directed toward an acceleration of the motor vehicle is provided, a recuperation mode in which the electric machine is operated as a generator, wherein a torque that is directed toward a deceleration of the motor vehicle is provided and electrical energy generated thereby is temporarily stored in the energy storage, and a charging mode in which the energy storage is charged with externally provided electrical energy until a predetermined target state of charge is achieved, wherein the motor vehicle is configured to when operating in the recuperation mode to determine a recuperation driving route driven during the recuperation mode and an associated recuperation energy amount and to store the recuperation driving route and the recuperation energy amount as driving route data in a driving route memory and/or to transmit the driving route data to an external data storage device, when switching into the charging mode or when operating in the charging mode to predictively determine an expected driving route of the motor vehicle and for the expected driving route to read out the driving route data from the driving route memory and/or to request the driving route data from the external data storage device, and to set the target state of charge to a value which is determined from a maximal state of charge of the energy storage and the recuperation energy amount stored n the driving route data.

Another aspect of the invention relates to a method for operating a motor vehicle fleet, which includes multiple motor vehicles. Each of the motor vehicles is hereby configured according to the description above or is operated according to the description above. After performing the recuperation mode all motor vehicles of the motor vehicle fleet transmit the recuperation driving route driven in the recuperation mode and the associated recuperation energy amount to the external data storage device and/or to all further motor vehicles of the motor vehicle fleet. Correspondingly all motor vehicles of the motor vehicle fleet can use the driving route data of the other motor vehicles so that a particularly energy efficient operation of the motor vehicle fleet is possible.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows two diagrams, wherein in a first one of the diagrams an elevation course of a driving route of a motor vehicle and in a second one of the diagrams a state of charge of an energy storage of drive device of the motor vehicle.

DETAILED DESCRIPTION OF PREFERRED EMBODIMENTS

Throughout all the FIGURES, same or corresponding elements may generally be indicated by same reference numerals. These depicted embodiments are to be understood as illustrative of the invention and not as limiting in any way.

It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The FIGURE shows in an upper first diagram an elevation course of a driving route of a motor vehicle. Correspondingly a purely exemplary course for the height h over the driving route s is shown. In a lower second diagram on the other hand a state of charge (SOC: state of charge) over the driving route s is shown.

The motor vehicle has an electric drive device, which includes an electric machine. By means of the electric machine for example a torque can be provided, which is directed toward an acceleration or a, deceleration of the motor vehicle. In particular it is provided that in a driving mode the electric machine is operated as a motor, wherein by means of energy withdrawn from an energy storage a torque that is directed toward an acceleration of the motor vehicle is provided. On the other hand in a recuperation mode the electric machine is operated as a generator, wherein a torque that is directed toward a deceleration of the motor vehicle is provided and electrical energy generated thereby is temporarily stored in the energy storage. In a charging mode the energy storage can be charged with the externally provided energy until reaching a predetermined target state of charge.

It can be seen that the motor vehicle drives uphill on an exemplary driving route before a position $s_0$. Hereby the state of charge of the energy storage decreases until a state of charge $SOC_0$ is reached at the point $s_0$. Purely exemplary the driving route has its greatest elevation h at this site $s_0$. At the site $s_0$ the charging mode is to be performed in order to charge the energy storage with externally provided electrical energy. In this respect for example a target state of charge of 100% can be used. Because the driving route extends downhill after the site $s_0$, i.e., the elevation h decreases when continuing on the driving route s, it would be useful to operate the drive device in the recuperation mode in order to prevent an acceleration of the motor vehicle above a defined speed, i.e., to brake or decelerate the motor vehicle.

Because in the recuperation mode the electric machine is operated as generator and correspondingly electrical energy is generated it is not possible to perform the recuperation mode at full energy storage, because the state of charge would have to be increased above a maximal state of charge, which corresponds to the state of charge of 100%. This is indicated purely exemplarily by a course 1.

For performing the charging mode it is therefore preferably provided to set the target state of charge to a value that takes the subsequent driving route of the motor vehicle into account. For the here shown exemplary case it is advantageous to use the state of charge $SOC_1$ as target state of charge. When the motor vehicle continues to drive along the driving route s in the recuperation mode starting from this state of charge the energy storage is fully charged at the end of the driving route or at the end of a downhill section of the driving route at a point $s_1$. After the point $s_1$ the driving route is for example approximately even so that at this location the drive device is operated in the driving mode. Correspondingly electrical energy is withdrawn from the energy storage so that its state of charge decreases.

This is for example accomplished in that when performing the recuperation mode the recuperation driving route driven in the recuperation mode and the associated recuperation energy amount are determined and are stored as driving route data in a driving route memory and/or are transmitted to an external data storage device. During the drive of the motor vehicle it is thus detected whether the recuperation mode is performed for a section of the driving route. This section corresponds to the recuperation driving route which together with the recuperation energy amount generated on the recuperation driving route is stored or transmitted in the form of the driving route data.

When now switching into the charging mode the expected driving route of the motor vehicle is predictively determined. For this expected driving route driving route data are read out from the driving route memory and/or are requested from the external data storage device. When for the expected driving route driving route data are already available, for example because they were either stored in the driving route memory or in the data storage device, the target state of charge for performing of the charging mode is set to a value which is determined from the maximal state of charge of the energy storage and the recuperation energy amount that is stored in the driving route data.

In this way the recuperation energy amount generated on the expected driving route can be taken into account for the expected driving route for charging the energy storage with externally provided electrical energy. On one hand this has the advantage that the externally provided electrical energy amount required in the charging mode is reduced, which reduces the costs for the driver of the motor vehicle. In addition the torque directed toward the deceleration of the motor vehicle can still be reliably provided also during the recuperation mode that follows the charging mode. This would not be the case if the energy storage had already reached its maximal state of charge. At the least other means would have to be relied upon, for example actuating an operating brake of the motor vehicle.

Generally it is irrelevant in which manner the driving route data are obtained. Particularly preferably they are detected and stored by the motor vehicle or multiple motor vehicles during the respective performance of a driving operation, i.e., in the driving route memory and/or the external data storage device. Subsequently the driving route data can be provided to at least one further motor vehicle or the multiple motor vehicles by the external data storage device. Thus in the case of a motor vehicle fleet a particularly efficient and comfortable operation of the motor vehicle can be accomplished.

What is claimed as new and desired to be protected by Letters Patent is set forth in the appended claims and includes equivalents of the elements recited therein:

1. Method for operating a motor vehicle which has an electrical drive device, said method comprising:
   operating the motor vehicle in one of three modes, a drive mode in which an electric machine of the drive device is operated as motor, wherein by means of electrical energy withdrawn from an energy storage a torque that is directed toward an acceleration of the motor vehicle is provided, a recuperation mode in which the electric machine is operated as a generator, wherein a torque that is directed toward a deceleration of the motor vehicle is provided and electrical energy generated thereby is temporarily stored in the energy storage, and a charging mode in which the energy storage is charged with externally provided electrical energy until a predetermined target state of charge is achieved;
   when operating the motor vehicle in the recuperation mode, determining a recuperation driving route driven during the recuperation mode and an associated recuperation energy amount and storing the recuperation driving route and the recuperation energy amount as driving route data in a driving route memory or transmitting the driving route data to an external data storage device;

when switching into the charging mode or when operating the motor vehicle in the charging mode predictively determining an expected driving route of the motor vehicle and for the expected driving route reading out the driving route data from the driving route memory or requesting the driving route data from the external data storage device; and setting the target state of charge to a value which is determined from a maximal state of charge of the energy storage and the recuperation energy amount stored in the driving route data.

2. The method of claim 1, wherein the determining of the expected driving route comprises generating a driving route profile of the motor vehicle and/or calendar using calendar data of a driver of the motor vehicle.

3. The method of claim 1, wherein the target state of charge is determined from a first prescribed state of charge or a second prescribed state of charge, wherein the target state of charge is set equal to the second prescribed state of charge when the second prescribed state of charge is greater than the first prescribed state of charge and is set equal to the first prescribed state of charge when the second prescribed state of charge is smaller than the first prescribed state of charge.

4. The method of claim 3, wherein the first prescribed state of charge corresponds to an amount of energy required for reaching the recuperation driving route stored in the driving route data.

5. The method of claim 3, wherein the second prescribed state of charge is set to the maximal state of charge minus the recuperation energy amount.

6. The method of claim 3, wherein the amount of energy required to reaching the recuperation driving route stored in the driving route data is added to the second prescribed state of charge.

7. The method of claim 1, wherein when multiple recuperation driving routes are present on the expected driving route only a recuperation driving route encountered first on the expected driving route is taken into account, or taking a recuperation driving route into account that is stored with a greatest recuperation energy amount.

8. The method of claim 3, wherein when multiple recuperation driving routes are present on the expected driving route the second prescribed state of charge is selected so that for the multiple recuperation driving route the state of charge of the energy storage present after each one of the recuperation driving routes is sufficient for reaching a respective following recuperation driving route.

9. The method of claim 1, further comprising providing the driving route data stored in the external data storage device to at least one further motor vehicle.

10. A motor vehicle, comprising an electric drive device, said motor vehicle being configured to be operated in three operating modes a driving mode in which an electric machine of the drive device is operated as motor, wherein by means of electrical energy withdrawn from an energy storage a torque that is directed toward an acceleration of the motor vehicle is provided, a recuperation mode in which the electric machine is operated as a generator, wherein a torque that is directed toward a deceleration of the motor vehicle is provided and electrical energy generated thereby is temporarily stored in the energy storage, and a charging mode in which the energy storage is charged with externally provided electrical energy until a predetermined target state of charge is achieved, said motor vehicle being configured when operating in the recuperation mode to determine a recuperation driving route driven during the recuperation mode and an associated recuperation energy amount and to store the recuperation driving route and the recuperation energy amount as driving route data in a driving route memory and/or to transmit the driving route data to an external data storage device, when switching into the charging mode or when operating in the charging mode to predictively determine an expected driving route of the motor vehicle and for the expected driving route to read out the driving route data from the driving route memory and/or to request the driving route data from the external data storage device, and to set the target state of charge to a value which is determined from a maximal state of charge of the energy storage and the recuperation energy amount stored in the driving route data.

* * * * *